US008694293B2

(12) United States Patent  
Kawaguchi et al.

(10) Patent No.: US 8,694,293 B2  
(45) Date of Patent: Apr. 8, 2014

(54) SIMULATION SUPPORT METHOD, COMPUTER-READABLE STORAGE MEDIUM STORING SIMULATION SUPPORT PROGRAM, AND SIMULATION SUPPORT APPARATUS

(75) Inventors: Akira Kawaguchi, Nishikamo-gun (JP); Zibo Kang, Nagoya (JP)

(73) Assignee: Toyota Technical Development Corporation, Toyota (JP)

( * ) Notice: Subject to any disclaimer, the term of this patent is extended or adjusted under 35 U.S.C. 154(b) by 953 days.

(21) Appl. No.: 12/458,021

(22) Filed: Jun. 29, 2009

(65) Prior Publication Data

US 2009/0326908 A1  Dec. 31, 2009

(30) Foreign Application Priority Data

Jun. 30, 2008  (JP) .................................. 2008-170027

(51) Int. Cl.  
*G06F 17/50* (2006.01)

(52) U.S. Cl.  
USPC .............................................. 703/6; 716/106

(58) Field of Classification Search  
USPC ................................................ 703/6; 716/106  
See application file for complete search history.

(56) References Cited

U.S. PATENT DOCUMENTS

| | | | |
|---|---|---|---|
| 5,758,123 A * | 5/1998 | Sano et al. ....................... 703/22 |
| 6,324,495 B1 * | 11/2001 | Steinman ......................... 703/17 |
| 7,873,507 B2 * | 1/2011 | Tatsuoka et al. ................ 703/21 |
| 2002/0052725 A1 * | 5/2002 | Wasynczuk et al. ............ 703/22 |
| 2005/0149898 A1 * | 7/2005 | Hakewill et al. ................ 716/18 |
| 2006/0248518 A1 * | 11/2006 | Kundert ........................ 717/140 |
| 2008/0178165 A1 * | 7/2008 | Baker ........................... 717/149 |

FOREIGN PATENT DOCUMENTS

| | | |
|---|---|---|
| JP | A-2003-228496 | 8/2003 |
| JP | A-2005-222420 | 8/2005 |
| JP | A-2007-122602 | 5/2007 |
| JP | A-2008-9880 | 1/2008 |

OTHER PUBLICATIONS

Sep. 4, 2012 Japanese Office Action issued in Japanese Patent Application No. 2009-155278 (with translation).

* cited by examiner

*Primary Examiner* — Dwin M Craig  
(74) *Attorney, Agent, or Firm* — Oliff PLC

(57) ABSTRACT

A simulation support method includes generating an operation interface used to convert a subject model to a model for parallel computation, in which a plurality of subsystem models are connected to each other, wherein the plurality of subsystem models correspond to a plurality of processes in one step, and the processes repeatedly run in parallel in a cluster computer; inserting dummy blocks in the subject model, when an instruction for converting the subject model to the model for parallel computation is provided through the operation interface, wherein the dummy blocks are used to synchronize the data in the processes, which are transmitted between the processes that run in parallel; and editing a simulation program for parallel computation, based on the model for parallel computation, wherein the simulation program for parallel computation is used to generate the processes that run in parallel in the cluster computer.

25 Claims, 12 Drawing Sheets

SIMULATION SUPPORT METHOD, COMPUTER-READABLE STORAGE MEDIUM STORING SIMULATION SUPPORT PROGRAM, AND SIMULATION SUPPORT APPARATUS

INCORPORATION BY REFERENCE

The disclosure of Japanese Patent Application No. 2008-170027 filed on Jun. 30, 2008 including the specification, drawings and abstract is incorporated herein by reference in its entirety.

BACKGROUND OF THE INVENTION

1. Field of the Invention

The invention relates to a simulation support method, a computer-readable storage medium storing a simulation support program, and a simulation support apparatus. More specifically, the invention relates to a technology for editing a simulation program for parallel computation performed in a cluster computer that includes a plurality of processors.

2. Description of the Related Art

The MATLAB (registered trademark) family including the Simulink (registered trademark) is widely known as a tool that provides a simulation prototyping environment for modeling, simulation, and analysis of a dynamic system in the real world. The MATLAB, which is a core module, provides a graphical user interface (GUI) and a numerical computation function. The Simulink provides the function of supporting creation of a block diagram model. The Real-TimeWorkshop (registered trademark) edits a stand-alone C code based on a model created and tested by the Simulink. The edited C code is used as a real-time application or a non-real-time application. This makes it possible to create a prototype, and conduct a Hardware-In-the-loop (HIL) test in a short time.

The time required for performing simulation increases with an increase in the size of a subject system to be simulated, such as a vehicle control system. Each of Japanese Patent Application Publication 2005-222420 and Japanese Patent Application Publication No. 2007-122602 describes a technology for speeding up simulation using a large model, by executing distributed processing.

Discrete-time responses are continuously output by repeatedly running a plurality of processes in parallel in a cluster computer. In the parallel computation, if data is transmitted from a process in the $n^{th}$ step (n is an integer) to another process, a computation should be performed using the data as an input, in the other process in the $(n+1)^{th}$ step. However, in the above-described technology, it is not ensured that the data in the processes are synchronized. Therefore, the result of simulation using parallel computation in an environment in which a model is generally created cannot be made completely equal to the result of simulation using sequential computation.

SUMMARY OF THE INVENTION

The invention provides a technology that makes a result of simulation performed using parallel computation completely equal to a result of simulation performed using sequential computation.

A first aspect of the invention relates to a simulation support method that includes generating an operation interface used to convert a subject model that is a block diagram model representing a subject system to be simulated, to a model for parallel computation, in which a plurality of subsystem models are connected to each other, wherein the plurality of subsystem models correspond to a plurality of processes in one step, and the processes repeatedly run in parallel in a cluster computer; inserting dummy blocks in the subject model, when an instruction for converting the subject model to the model for parallel computation is provided through the operation interface, wherein the dummy blocks are used to synchronize the data in the processes, which are transmitted between the processes that run in parallel; and editing a simulation program for parallel computation, based on the model for parallel computation that is the subject mode in which at least the dummy blocks are inserted, wherein the simulation program for parallel computation is used to generate the processes that run in parallel in the cluster computer.

In the simulation support method according to the above-described aspect, the dummy blocks may be used to make an output of the model for parallel computation, which is obtained by parallel computation, equal to an output of the model for parallel computation, which is obtained by sequential computation.

According to the above-described aspect of the invention, the dummy blocks are inserted in the subject model. The dummy block are used to synchronize the data in the processes, which are transmitted between the processes that run in parallel. Also, the dummy blocks are used to make the output of the model for parallel computation, which is obtained by parallel computation, equal to the output of the model for parallel computation, which is obtained by sequential computation. Therefore, it is possible to make the result of simulation performed using parallel computation completely equal to the result of simulation performed using sequential computation.

In the simulation support method, the dummy blocks may be used to make an output of the model for parallel computation, which is obtained by parallel computation, equal to an output of the subject model, which is obtained by sequential computation, if an input of the model for parallel computation is equal to an input of the subject model. With the configuration, it is possible to make the result of simulation performed on the model for parallel computation using parallel computation completely equal to the result of simulation performed on the subject model using sequential computation.

In the simulation support method, an operation for specifying, in each of the subsystem models, a processor corresponding to the subsystem model may be received in the operation interface.

In the case where the response of the model for parallel computation is computed by running the processes, the initial value is required for each of the processes in the first step in which the processes start to run in parallel. The initial value of a certain process in the parallel computation is equivalent to the output of a process that runs before the certain process runs in the sequential computation.

Thus, in the simulation support method, initial values of inputs of the subsystem models may be obtained by computing a response of the subject model; and initial values of the dummy blocks, which are initial values of inputs of the respective processes, may be set to the initial values of the inputs of the respective subsystem models. With this configuration, it is possible to automatically set the initial value required for each of the processes, in the simulation program for parallel computation.

In the simulation support method, a first code group may be incorporated into the simulation program for parallel computation, and the first code group may be used to transmit the data between the processes that run in parallel during a period from when all computations in the processes that run in parallel end, to when the data in the processes are updated, in each step.

With the configuration, it is possible to make the result of simulation performed using parallel computation completely equal to the result of simulation performed using sequential computation.

The codes, which are used to identify the processor that mainly transmits the data and the processor that receives the data, need to be set in the code group used to transmit the data between the processes that run in parallel. When the simulation program for parallel computation is edited using the model for parallel computation, the codes used to identify the processors that transmit and receive the data are described in association with the signal line that functions as the separator between the subsystem models.

Thus, in the simulation support method, when the instruction for converting the subject model to the model for parallel computation is provided through the operation interface, an attribute, which is converted to a code that functions as a search key, may be set in a signal line that functions as a separator between the subsystem models, a position of a second code group corresponding to the signal line may be located, using the code as the key, identifiers for identifying the processes, which transmit and receive the data in accordance with the signal line, may be extracted from the second code group, and the extracted identifiers may be set in the first code group used to transmit the data between the processes that run in parallel.

With the configuration, it is possible to search for the codes described in association with the signal line that functions as the separator between the subsystem models, at a high speed. Therefore, it is possible to speed up the process of incorporating, into the simulation program for parallel computation, the first code group used to transmit the data between the processes that run in parallel during the period from when all the computations in the processes that run in parallel end, to when the data in the processes are updated, in each step.

A second aspect of the invention relates to a computer-readable storage medium storing a simulation support program that makes a computer function as: an operation interface used to convert a subject model that is a block diagram model representing a subject system to be simulated, to a model for parallel computation, in which a plurality of subsystem models are connected to each other, wherein the plurality of subsystem models correspond to a plurality of processes in one step, and the processes repeatedly run in parallel in a cluster computer, a modeling support portion that inserts dummy blocks in the subject model, when an instruction for converting the subject model to the model for parallel computation is provided to the modeling support portion through the operation interface, wherein the dummy blocks are used to synchronize the data in the processes, which are transmitted between the processes that run in parallel; and a program edit portion that edits a simulation program for parallel computation, based on the model for parallel computation that is the subject model in which at least the dummy blocks are inserted, wherein the simulation program for parallel computation is used to generate the processes that run in parallel in the cluster computer.

In the computer-readable storage medium storing the simulation support program, the dummy blocks may be used to make an output of the model for parallel computation, which is obtained by parallel computation, equal to an output of the model for parallel computation, which is obtained by sequential computation.

The dummy blocks may be used to make an output of the model for parallel computation, which is obtained by parallel computation, equal to an output of the subject model, which is obtained by sequential computation, if an input of the model for parallel computation is equal to an input of the subject model. With the configuration, it is possible to make the result of simulation performed on the model for parallel computation using parallel computation completely equal to the result of simulation performed on the subject model using sequential computation.

The storage medium may be a magnetic storage medium or a magneto-optical storage medium. Further, any storage medium that will be developed in the future may be employed.

According to the second aspect of the invention, it is possible to make the computer function as the simulation apparatus that inserts dummy blocks in the subject model. The dummy blocks are used to synchronize the data in the processes, which are transmitted between the processes that run in parallel. Also, the dummy blocks are used to make the output of the model for parallel computation, which is obtained by parallel computation, equal to the output of the model for parallel computation, which is obtained by sequential computation. Therefore, it is possible to make the result of simulation performed using parallel computation completely equal to the result of simulation performed using sequential computation.

A third aspect of the invention relates to a simulation support apparatus that includes an operation interface used to convert a subject model that is a block diagram model representing a subject system to be simulated, to a model for parallel computation, in which a plurality of subsystem models are connected to each other, wherein the plurality of subsystem models correspond to a plurality of processes in one step, and the processes repeatedly run in parallel in a cluster computer; a modeling support portion that inserts dummy blocks in the subject model, when an instruction for converting the subject model to the model for parallel computation is provided to the modeling support portion through the operation interface, wherein the dummy blocks are used to synchronize the data in the processes, which are transmitted between the processes that run in parallel; and a program edit portion that edits a simulation program for parallel computation, based on the model for parallel computation that is the subject model in which at least the dummy blocks are inserted, wherein the simulation program for parallel computation is used to generate the processes that run in parallel in the cluster computer.

In the simulation support apparatus, the dummy blocks may be used to make an output of the model for parallel computation, which is obtained by parallel computation, equal to an output of the model for parallel computation, which is obtained by sequential computation.

According to the third aspect of the invention, the dummy blocks are inserted in the subject model. The dummy blocks are used to synchronize the data in the processes, which are transmitted between the processes that run in parallel. Also, the dummy blocks are used to make the output of the model for parallel computation, which is obtained by parallel computation, equal to the output of the model for parallel computation, which is obtained by sequential computation. Therefore, it is possible to make the result of simulation performed using parallel computation completely equal to the result of simulation performed using sequential computation.

The dummy blocks may be used to make an output of the model for parallel computation, which is obtained by parallel computation, equal to an output of the subject model, which is obtained by sequential computation, if an input of the model for parallel computation is equal to an input of the subject model. With the configuration, it is possible to make the result of simulation performed on the model for parallel computation using parallel computation completely equal to the result of simulation performed on the subject model using sequential computation.

A fourth aspect of the invention relates to a simulation apparatus that includes the simulation support apparatus according to the third aspect; and a simulation portion that computes a response of the subject model.

According to the fourth aspect of the invention, the dummy blocks are inserted in the subject model. The dummy blocks are used to synchronize the data in the processes, which are transmitted between the processes that run in parallel. Also, the dummy blocks are used to make an output of the model for parallel computation, which is obtained by parallel computation, equal to an output of the model for parallel computation, which is obtained by sequential computation. Therefore, it is possible to make the result of simulation performed using parallel computation completely equal to the result of simulation performed using sequential computation.

A fifth aspect of the invention relates to a simulation method that includes computing a response of a subject model that is a block diagram model representing a subject system to be simulated, in a host computer; generating, in the host computer, an operation interface used to convert the subject model to a model for parallel computation, in which a plurality of subsystem models are connected to each other, wherein the plurality of subsystem models correspond to a plurality of processes in one step, and the processes repeatedly run in parallel in a cluster computer; inserting dummy blocks in the subject model in the host computer, when an instruction for converting the subject model to the model for parallel computation is provided through the operation interface, wherein the dummy blocks are used to synchronize the data in the processes, which are transmitted between the processes that run in parallel; editing a simulation program for parallel computation, based on the model for parallel computation that is the subject model in which at least the dummy blocks are inserted, wherein the simulation program for parallel computation is used to generate the processes that run in parallel in the cluster computer; and computing a response of the model for parallel computation, by executing the simulation program for parallel computation in the cluster computer.

In the simulation method, the dummy blocks may be used to make an output of the model for parallel computation, which is obtained by parallel computation, equal to an output of the model for parallel computation, which is obtained by sequential computation.

The dummy blocks may be used to make an output of the model for parallel computation, which is obtained by parallel computation, equal to an output of the subject model, which is obtained by sequential computation, if an input of the model for parallel computation is equal to an input of the subject model. With the configuration, it is possible to make the result of simulation performed on the model for parallel computation using parallel computation completely equal to the result of simulation performed on the subject model using sequential computation.

According to the fifth aspect of the invention, the dummy blocks are inserted in the subject model. The dummy blocks are used to synchronize the data in the processes, which are transmitted between the processes that run in parallel. Also, the dummy blocks are used to make the output of the model for parallel computation, which is obtained by parallel computation, equal to the output of the model for parallel computation, which is obtained by sequential computation. Therefore, it is possible to make the result of simulation performed using parallel computation in the cluster computer completely equal to the result of simulation performed using sequential computation in the host computer.

The dummy blocks may be used to make an output of the model for parallel computation, which is obtained by parallel computation, equal to an output of the subject model, which is obtained by sequential computation, if an input of the model for parallel computation is equal to an input of the subject model. With the configuration, it is possible to make the result of simulation performed on the model for parallel computation using parallel computation completely equal to the result of simulation performed on the subject model using sequential computation.

The order, in which the above-described operations are performed, is not limited to the order in which the operations are described, unless an impediment occurs. The operations may be performed simultaneously, or may be performed in an order opposite to the order in which the operations are described. Further, the operations need not necessarily be performed consecutively. The functions of each of the above-described portions may be implemented by a hardware resource whose function is determined by the configuration of the hardware resource, a hardware resource whose function is determined by a program, or combination of the hardware resources. The functions of the above-described portions need not necessarily be implemented by hardware resources that are physically independent of each other.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
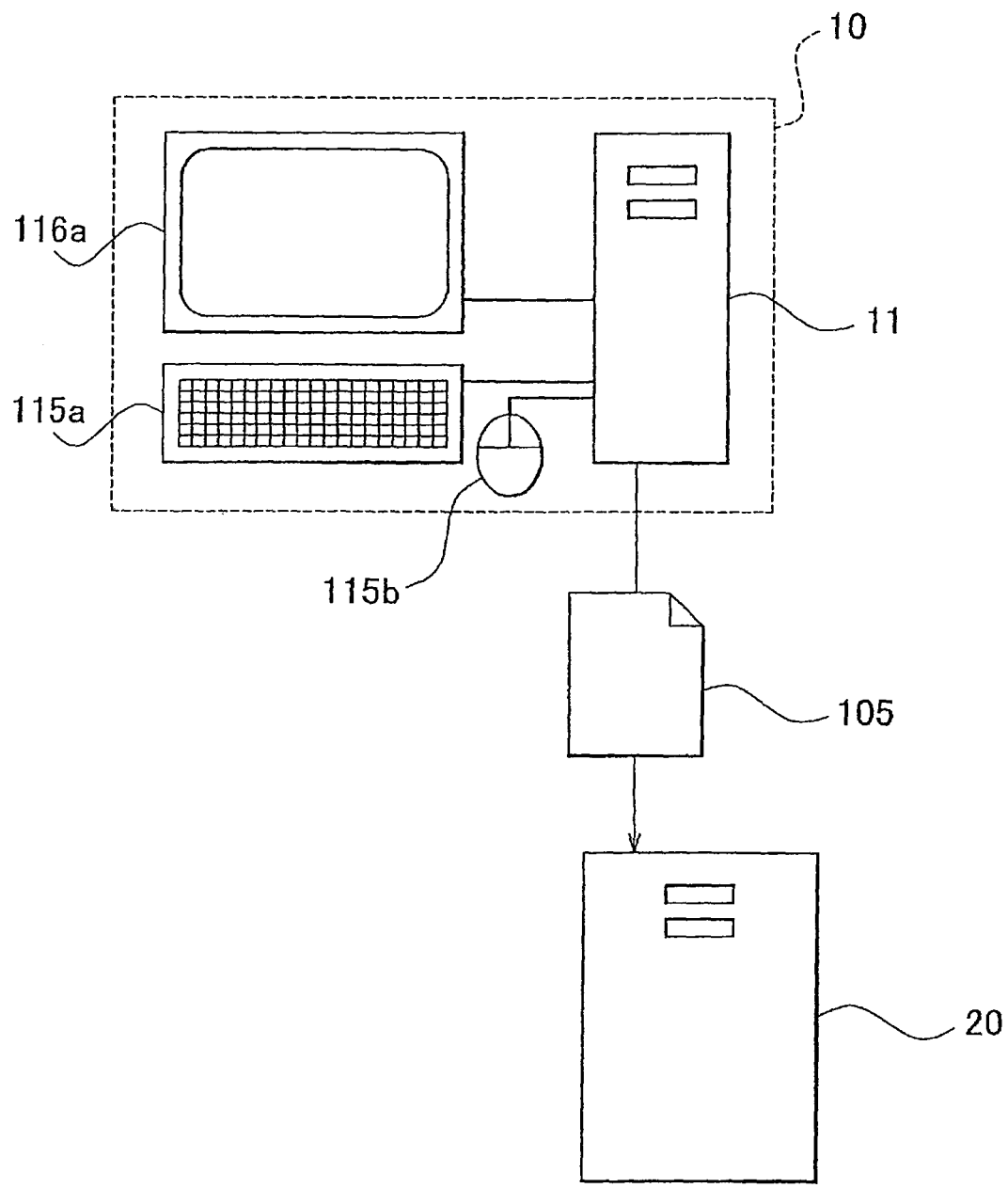
FIG. 1 is a schematic diagram according to an embodiment of the invention.

Hereinafter, an embodiment of the invention will be described with reference to the accompanying drawings. In the drawings, the same and corresponding constituent elements are denoted by the same reference numerals, and the redundant description will be omitted.

1. SUMMARY

FIG. 1 shows an entire configuration of a simulation system 1 according to the embodiment of the invention. The simulation system 1 includes a host computer 10 that includes a single processor; and a cluster computer 20 that includes a plurality of processors. In the host computer 10, a subject model that represents a large subject system, such as a vehicle control system, is created, and a simulation program 105 for parallel computation is edited. The simulation program 105 for parallel computation is used to compute the response of the subject model at a high speed in the cluster computer 20. In the cluster computer 20, the response of the subject model is computed by executing the simulation program 105 for parallel computation.

2. CONFIGURATION OF HARDWARE

2.1 Host Computer

Figure 2:
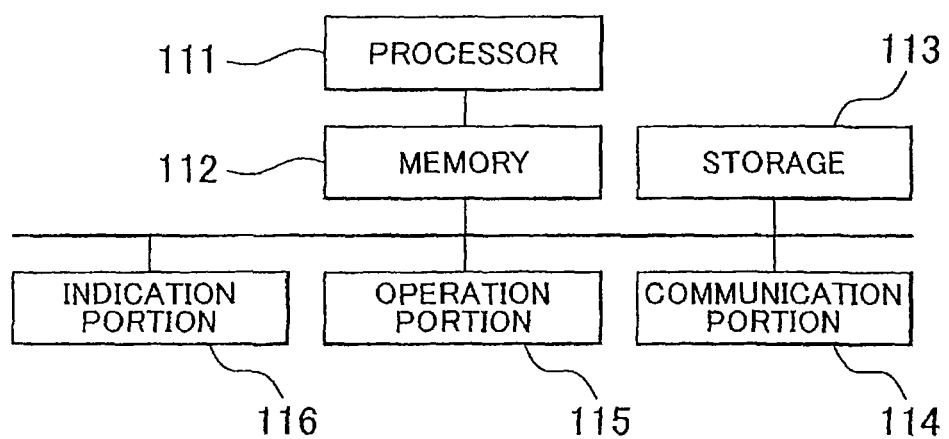
FIG. 2 is a block diagram according to the embodiment of the invention.

FIG. 2 is a block diagram showing a hardware configuration of the host computer 10. A storage 113 includes a non-volatile storage medium such as a hard disk. Various programs, which are executed by a processor 111, are stored in the storage 113. Various programs, which are executed by the processor 111, are temporarily stored in a memory 112 that is a main storage device. For example, an operating system (OS), the MATrix LABoratory (MATLAB), the Simulink, the Real-Time Workshop, and a simulation support program are temporarily stored in the memory 112. The processor 111 executes the programs stored in the memory 112, and stores the results of the execution of the programs in the memory 112. An indication portion 116 includes a display 116a that displays a screen that constitutes Graphical User Interfaces (GUIs) of the host computer 10 and the cluster computer 20; and a control circuit for the display 116a. Screen data that constitutes the GUI is stored in a video memory region of the memory 112. An operation portion 115 includes, for example, a keyboard 115a and a mouse 115b that are used to operate the host computer 10 and the cluster computer 20. A communication portion 114 controls communication between the host computer 10 and the cluster computer 20. The memory 112, the storage 113, the indication portion 116, the operation portion 115, and the communication portion 114 are connected to each other by a signal line such as a bus.

2.2 Cluster Computer

Figure 3:
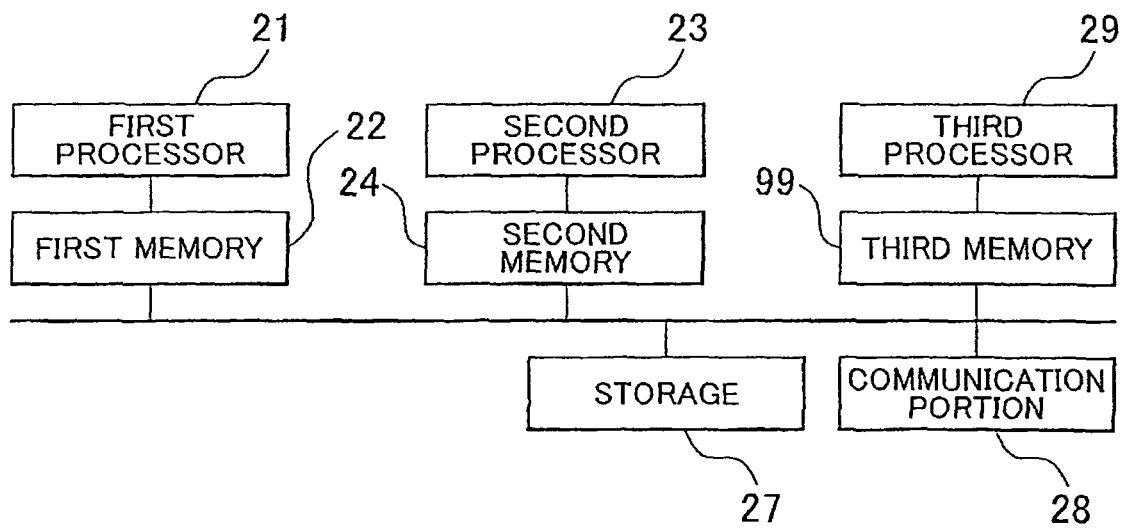
FIG. 3 is a block diagram according to the embodiment of the invention.

FIG. 3 is a block diagram showing a hardware configuration of the cluster computer 20. A storage 27 includes a non-volatile storage medium such as a hard disk. Various programs, which are executed by a first processor 21 and a second processor 23, are stored in the storage 27. Various programs, such as the operating system (OS), and the simulation program for parallel computation, are temporarily stored in a first memory 22 and a second memory 24 that are main storage devices. The first processor 21 and the second processor 23 execute the common simulation program for parallel computation. However, the first processor 21 executes commands assigned to the first processor 21, and the second processor 23 executes commands assigned to the second processor 23. Thus, the first processor 21 and the second processor 22 store different execution results in the first memory 22 and the second memory 24, respectively. A communication portion 28 controls communication between the host computer 10 and the cluster computer 20. The first memory 22, the second memory 24, the storage 27, and the communication portion 28 are connected to each other by a signal line such as a bus. By connecting the cluster computer 20 to the host computer 10 using a communication network, it is possible for the host computer 10 to operate the cluster computer 20.

3. CONFIGURATION OF A SIMULATION PROGRAM FOR SEQUENTIAL COMPUTATION

Figure 4:
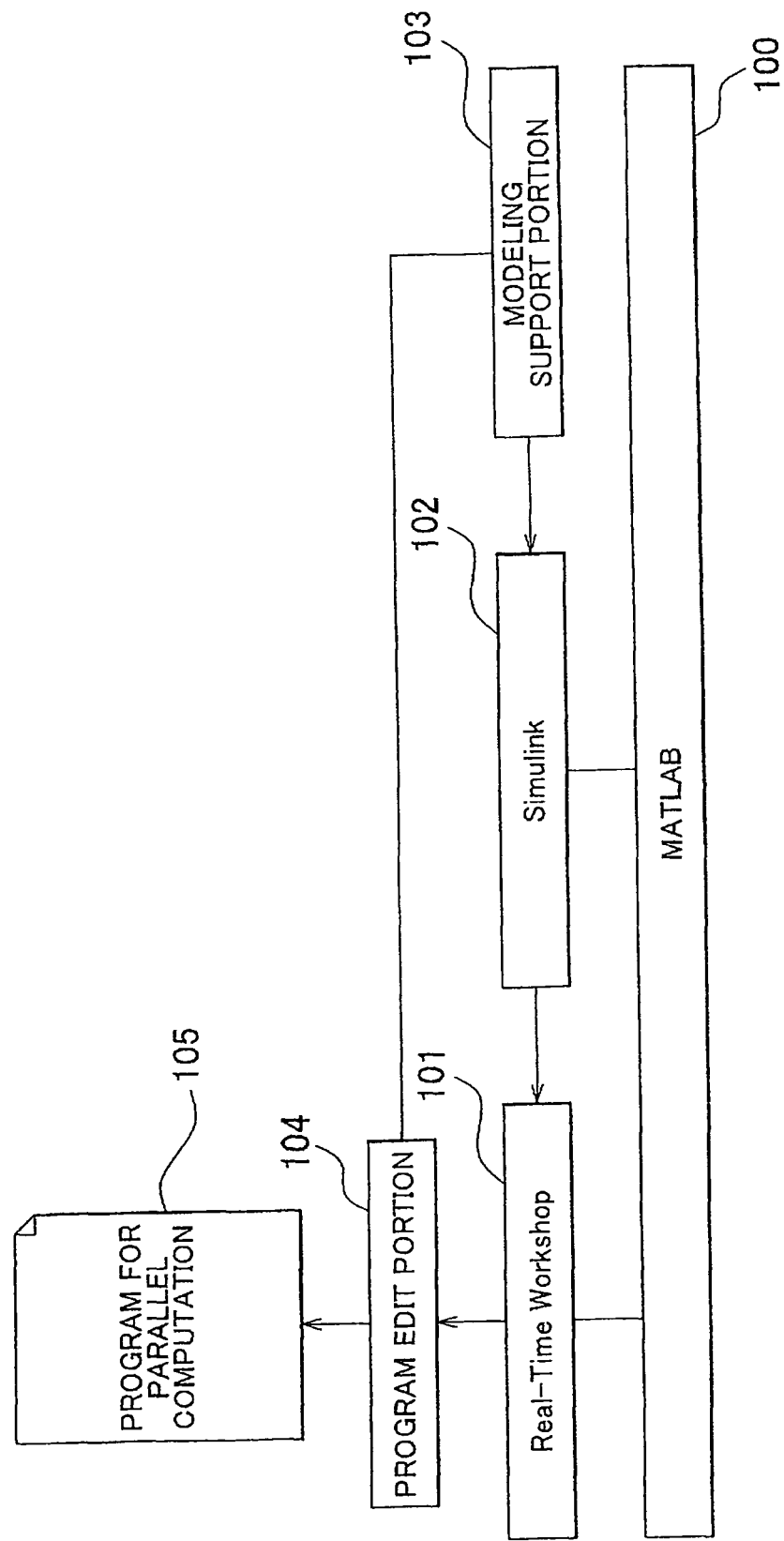
FIG. 4 is a block diagram according to the embodiment of the invention.

FIG. 4 is a block diagram showing a configuration of a simulation program for sequential computation, which is executed in the host computer 10. The simulation program for sequential computation includes the MATLAB product family developed by the MathWorks Inc., in the United States of America, and a simulation support program that is an extension tool, and that is executed in association with the MATLAB product family.

The MATLAB 100 is a core module that implements a numerical computation function. The Simulink 102 is a module that implements the function of creating a block diagram model and a test function in the GUI environment. The Real-TimeWorkshop (hereinafter, simply referred to as "RTW") 101 is a module that creates a C-language source file that can be executed independently of the model created by the Simulink 102. The simulation support program includes a modeling support portion 103 and a program edit portion 104.

The modeling support portion 103 is a module that generates an operation interface used to convert a subject model to a model for parallel computation, in which a plurality of subsystem models are connected to each other. The plurality of subsystem models correspond to a plurality of processes in one step, and the processes repeatedly run in parallel in the cluster computer 20. In addition, when the modeling support portion 103 receives an instruction for converting the subject model to the model for parallel computation through the operation interface, the modeling support portion 103 inserts dummy blocks in the subject model. The dummy blocks are used to synchronize data in the processes, which are transmitted between the processes that run in parallel. The dummy blocks are used to make an output of the model for parallel computation, which is obtained by parallel computation, equal to an output of the model for parallel computation, which is obtained by sequential computation. Also, the modeling support portion 103 obtains initial values of inputs of the subsystem models by making the MATLAB 100 compute the response of the subject model. Then, the modeling support portion 103 sets initial values of the dummy blocks to the initial values of the inputs of the respective subsystem models. Also, when the subject model is converted to the model for parallel computation, the modeling support portion 103 may set an attribute that is converted to a code that functions as a search key, in a signal line that functions as a separator between the subsystem models.

The program edit portion 104 is a module that edits the simulation program 105 for parallel computation, which is used to generate the plurality of processes that run in parallel in the cluster computer 20, based on the model for parallel computation, in cooperation with the RTW 101. The initial values of the dummy blocks, which are set by the modeling support portion 103, are set in the simulation program 105 for parallel computation by the RTW 101. The program edit portion 104 incorporates, into the simulation program 105 for parallel computation, a code group used to transmit the data between the processes that run in parallel during a period from when all the computations in the processes that run in parallel end, to when the data in the processes are updated, in each step. At this time, the program edit portion 104 locates the position of a code group (a computation section 1051 and an update section 1052 described later) corresponding to the signal line that functions as the separator, by using, as the key, the code that is described by the RTW 101 in association with the signal line. Then, the program edit portion 104 extracts identifiers for identifying processes that transmit and receive the data in accordance with the signal line, from the code group, and sets processor designation codes that are the extracted identifiers, in the code group used to transmit the data between the processes that run in parallel (i.e., the program edit portion 104 sets the processor designation codes in a communication section 1053 described later).

4. CONFIGURATION OF THE SIMULATION PROGRAM FOR PARALLEL COMPUTATION

Figure 5:
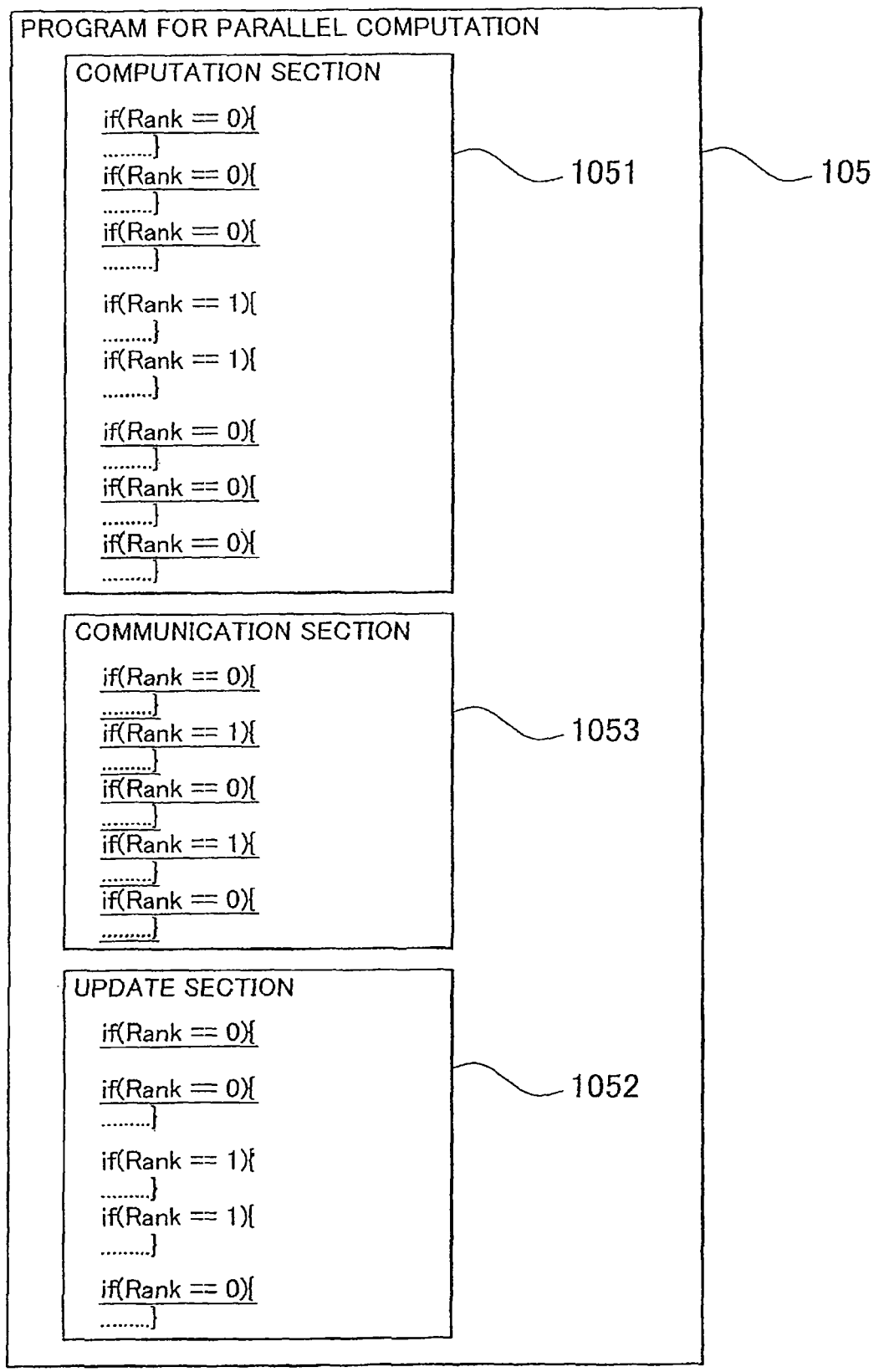
FIG. 5 is a diagram showing a source code according to the embodiment of the invention.

FIG. 5 is a block diagram showing a source code of the simulation program 105 for parallel computation. The simulation program 105 for parallel computation is treated as one text file in which the C language is described. The simulation program 105 for parallel computation includes the computation section 1051, the update section 1052, and the communication section 1053. The computation section 1051 makes the processors perform computations to return outputs in accordance with inputs. The update section 1052 updates the data in the processes corresponding to the computation section 1051. The communication section 1053 controls the communication between the processes that run in parallel. The computation section 1051 is described using a computation function. The update section 1052 is described using an update function. The communication section 1053 is described using a Message Passing Interface (MPI) function. The RTW 101 generates the simulation program 105 for parallel computation excluding portions that make it possible to perform parallel computation, such as the communication section 1053. The program edit portion 104 adds the communication section 1053 and the processor designation codes, and thus, the simulation program 105 for parallel computation is completed. By compiling the simulation program 105 for parallel computation, the simulation program 105 for parallel computation is changed to one executable file that can be executed in the cluster computer 20. The portions added by the program edit portion 104 are indicated by underlines in FIG. 5. The portions added by the program edit portion 104 include the processor designation codes "if(Rank==x)", each of which indicates what processor runs the process corresponding to the code, and the communication section 1053 described using the Message Passing Interface (MPI). The other portions are described by the RTW 101.

5. SIMULATION METHOD

Figure 6:
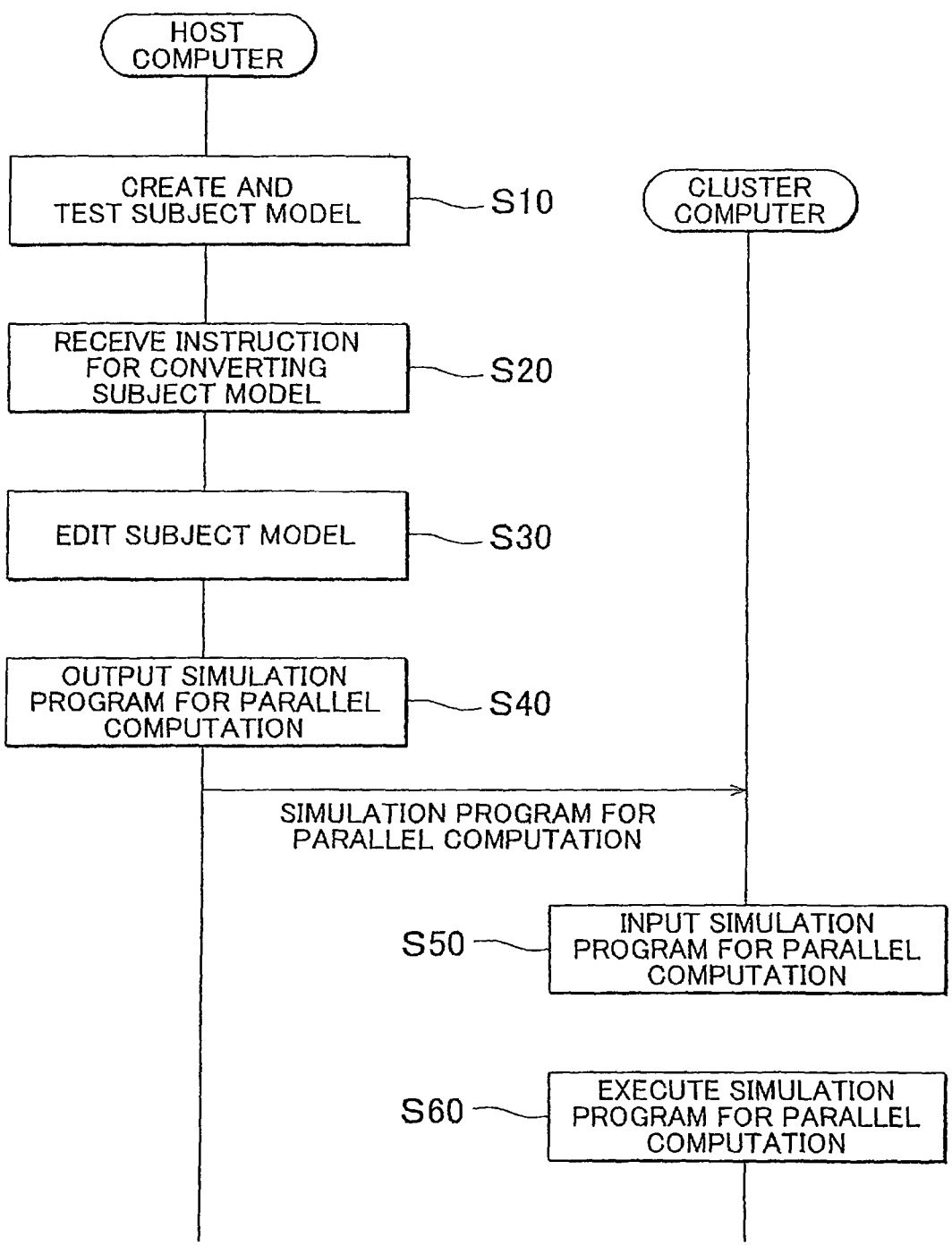
FIG. 6 is a sequence chart according to the embodiment of the invention.
Figure 7:
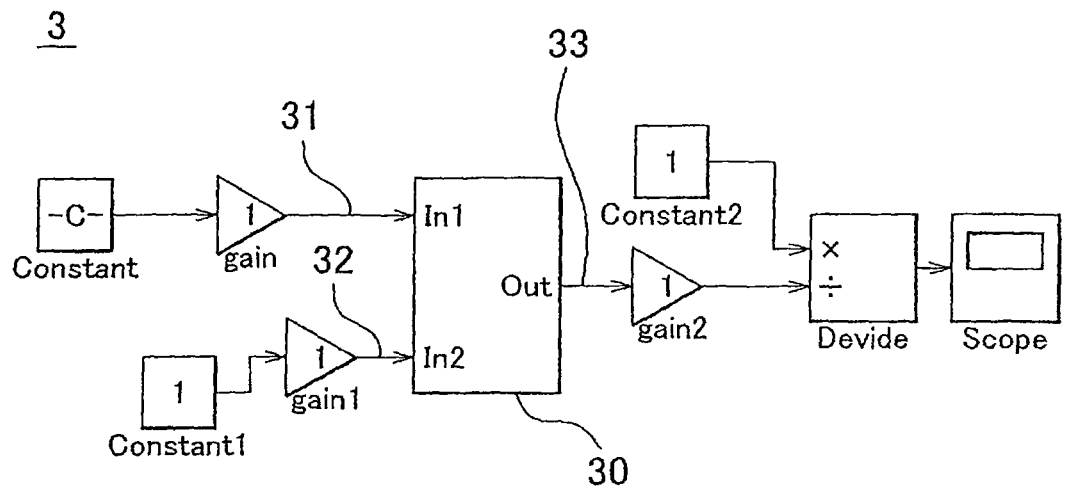
FIG. 7 is a block diagram according to the embodiment of the invention.
Figure 8:
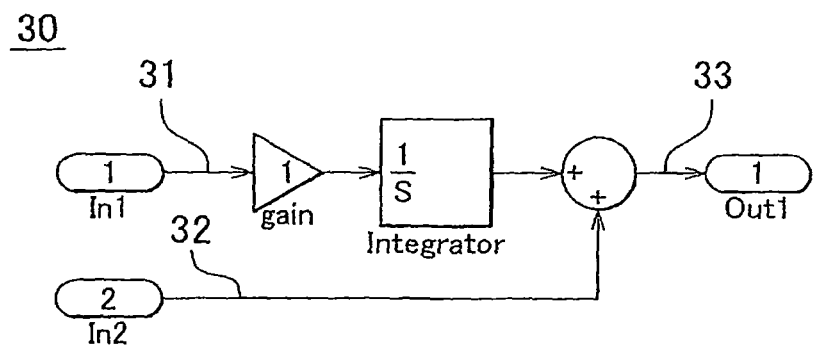
FIG. 8 is a block diagram according to the embodiment of the invention.

FIG. 6 is a sequence chart showing the entire flow of a simulation method according to the embodiment of the invention. First, the subject model, which is a block diagram model representing a subject system to be simulated, is created in the host computer 10 (step S10). At this time, a user can create the subject model while testing the response of the subject model. The environment for creating the subject model is provided by the MATLAB 100 and the Simulink 102. FIG. 7 shows an example of the subject model, and FIG. 8 shows a subsystem model 30 constituting a block 30 that is a part of the subject model, in order to describe the embodiment. The subject model 3 shown in FIG. 7 and FIG. 8 is a block diagram model displayed in a specific region of the display 116a in the GUI environment provided by the Simulink 102. Each of the subject model 3 and the subsystem model 30 is created by dragging and dropping blocks to specific regions, and connecting the blocks using signal lines, and setting attributes in the blocks and the signal lines. In the embodiment, an example, in which the subject model 3 is converted to the model for parallel computation that includes the subsystem model 30, will be described.

Next, the host computer 10 receives the conversion instruction for converting the subject model 3 to the model for parallel computation, in which the plurality of subsystem models are connected to each other (step S20). The plurality of subsystem models correspond to the plurality of processes in one step, and the processes repeatedly run in parallel in the cluster computer 20. The modeling support portion 103 generates the operation interface used to convert the subject model to the model for parallel computation. More specifically, for example, an operation for specifying, in the subsystem model 30, the processor corresponding to the subsystem model 30 is received through a menu or an icon for receiving the conversion instruction. The modeling support portion 103 adds the menu or the icon to the GUI environment provided by the Simulink 102. The user performs an operation for selecting a block that is regarded as the subsystem model 30, and sets an identifier for identifying the processor. When the conversion instruction is received according to the operation of the keyboard 115a or the mouse 115b, the identifier (for example, 0, 1, or 2) for identifying the process (the processor) corresponding to the selected block is set in the subsystem model 30. The selected block is regarded as the atomic subsystem model 30 that is indivisibly and continuously executed by one processor. The processor that computes the response of the subsystem model 30 is identified using the identifier (for example, 0, 1, or 2) for the process. The identifier may be designated by the user, or may be automatically assigned to the subsystem model.

Figure 9:
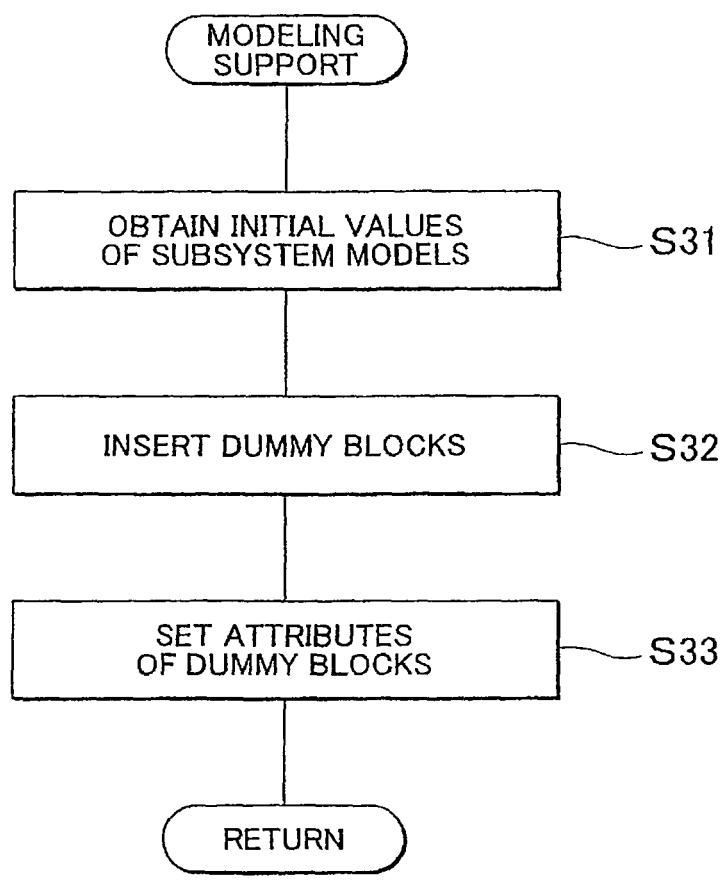
FIG. 9 is a flowchart according to the embodiment of the invention.

When the instruction for converting the subject model 3 to the model for parallel computation is provided, dummy blocks are inserted in the subject model (step S30) in the host computer 10. The dummy blocks are used to synchronize the data in the processes corresponding to the subsystem models, which are transmitted between the processes. The dummy blocks are used to make an output of the model for parallel computation, which is obtained by parallel computation, equal to an output of the model for parallel computation, which is obtained by sequential computation. FIG. 9 is a flowchart showing the flow of a process of converting the subject model to the model for parallel computation by editing the subject model, which is executed by the modeling support portion 103.

First, the modeling support portion 103 obtains the initial value of each subsystem model by making the MATLAB 100 perform a computation in one step based on the subject model 3 (step S31). For example, it is possible to obtain the initial values of the subsystem models by performing the computation in one step while output blocks are connected to signal lines 31, 32, and 33 (refer to FIG. 8) that function as separators. The process of obtaining the initial values of the subsystem models can be executed without intervention of the user, if the modeling support portion 103 transmits a control signal to the Simulink 102 as a message, instead of the user's operation required for this process.

Figure 10:
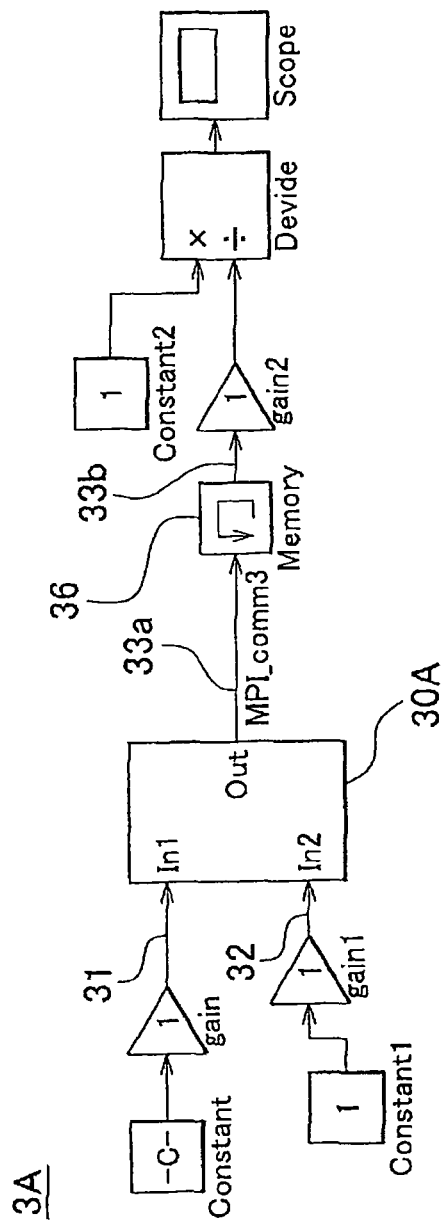
FIG. 10 is a block diagram according to the embodiment of the invention.
Figure 11:
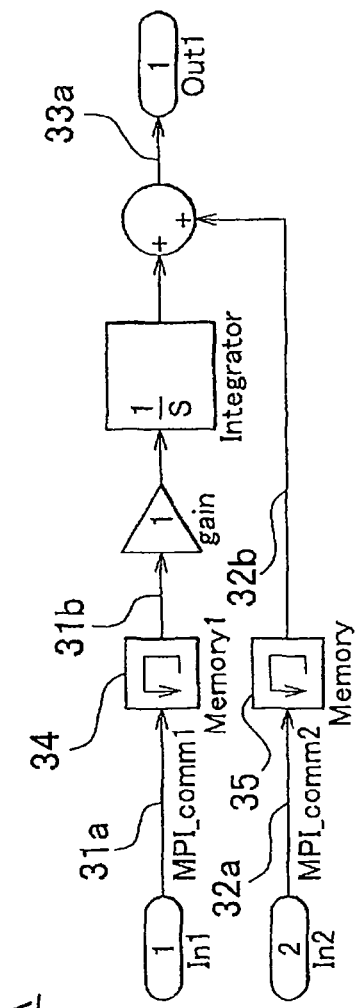
FIG. 11 is a block diagram according to the embodiment of the invention.

Subsequently, the modeling support portion 103 divides each of the signal lines 33, 34, and 35, and inserts memory blocks, which function as the dummy blocks, in the subject model (step S32). FIG. 10 shows the subject model after the memory block is inserted in the subject model 3, that is, a parallel computation model 3A. FIG. 11 shows a subsystem model 30A in which the memory blocks are inserted. The memory blocks 34, 35, and 36 represent processes of storing values that pass through the signal lines 31, 32, and 33 as variables corresponding to the respective memory blocks until the memory blocks are explicitly updated. That is, each memory block outputs a value equal to a value input to the memory block. After all the computations in the processes end in a preceding step, values stored in the memory blocks in a step before the preceding step are updated to values input to the memory blocks in the preceding step, and the updated values are output from the memory blocks when the computations are performed in the processes in a current step. The memory blocks 34, 35, and 36 are updated at a timing at which the processors in the cluster computer 20 execute the commands corresponding to the update section 1052 shown in FIG. 5. As describe below, because the memory blocks 34, 35, and 36 are inserted, functions that update the respective memory blocks 34, 35, and 36 are described once in the update section 1052 when the RTW 101 generates the source code. Each of the memory blocks 34, 35, and 36 is positioned so that the input of the subsystem model to which the memory block belongs, that is, the output of the subsystem model positioned immediately ahead of the subsystem model to which the memory block belongs is equal to the input of the memory block. Accordingly, even if a value is output from the process corresponding to the subsystem model 30A positioned immediately ahead of the subsystem model to which the memory block 36 belongs, regardless of the step of the process corresponding to the subsystem to which the memory block 36 belongs, a value maintained in the memory block 36 is not changed until the memory block 36 is explicitly updated in the process corresponding to the subsystem model to which the memory block 36 belongs. That is, the memory blocks 34, 35, and 36 substantially delays the communication between the blocks that belong to the different respective processes that run in parallel in the cluster computer 20.

Then the modeling support portion 103 sets the initial values of the memory blocks 34, 35, and 36 as the attributes of the memory blocks (step S33). The initial values of the memory blocks are set to the values that are obtained as the initial values of the respective subsystem models in step S31 described above. At this time, a special common name or "a test point", which is the attribute that is converted to a code that can be used as a search key in the source code, may be set in each of the signal lines 31a, 32a, and 33a that are connected to the inputs of the memory blocks 34, 35, and 36, respectively, and that function as the separators between the subsystem models.

Figure 12:
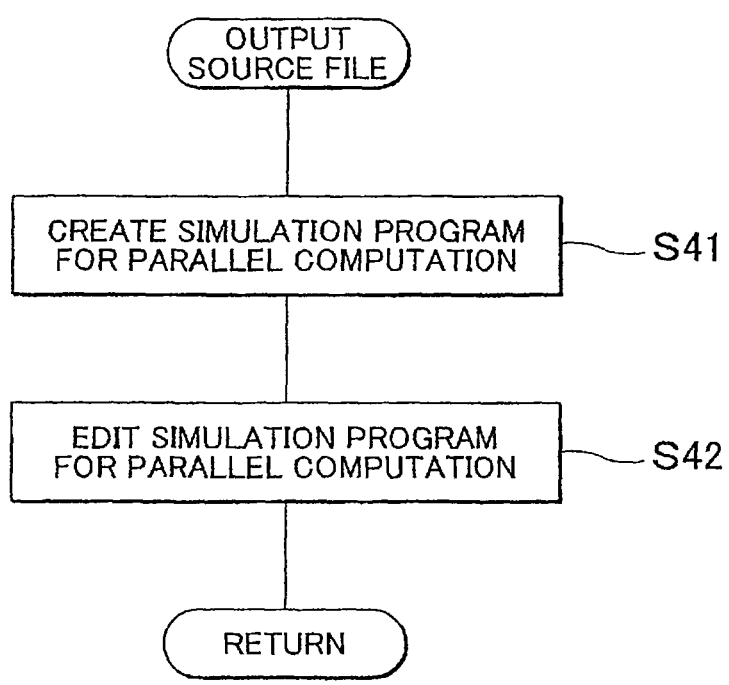
FIG. 12 is a flowchart according to the embodiment of the invention.

As shown in FIG. 6, when the subject model is converted to the model for parallel computation by editing the subject model, a process of outputting the simulation program 105 for parallel computation is executed. That is, the simulation program 105 for parallel computation, which is used to generate the plurality of processes that run in parallel in the cluster computer 20, is edited in the host computer 10, based on the model for parallel computation (step S40). FIG. 12 is a flowchart showing the flow of the process of outputting the simulation program 105 for parallel computation. The simulation program 105 for parallel computation is output as a source file. The process shown in FIG. 12 is started, when the user provides an instruction for outputting the source file used to compute the response of the subject model 3 in the cluster computer 20.

As shown in FIG. 12, first, the RTW 101 generates the simulation program for parallel computation. Because all the blocks and all the signal lines that constitute the model for parallel computation conform to the RTW 101, the simulation program for parallel computation, which completely corresponds to the model for parallel computation, is generated.

Subsequently, the program edit portion 104 edits the simulation program 105 for parallel computation, based on the model for parallel computation. More specifically, the processes (the processors) corresponding to all the subsystem models are set. In addition, the communication section 1053, which is the code group, is incorporated into the simulation program 105 for parallel computation so that the data are transmitted between the processes that run in parallel, during the period from when all the computations in the processes that run in parallel end, to when the data in the processes are updated, in each step. As described above, the identifier for identifying the corresponding process is set in the block 30A that is explicitly designated as the subsystem model 30A using the GUI provided by the modeling support portion 103. However, the identifier for identifying the corresponding process is not set in the other block(s) in the subject model 3, which is(are) created using the GUI of the Simulink 102. Therefore, the program edit portion 104 specifies the processes (the processors) corresponding to all the subsystem models. Also, in the distributed-memory cluster computer 20, a variable stored in the first memory 22 is synchronized with a variable stored in the second memory 24, which is the same as the variable stored in the first memory 22, at a timing set by design through communication using the MPI function. The first memory 22 and the second memory 24 are the main storage devices of the different processors. Accordingly, the communication section 1053 is incorporated into the simulation program 105 for parallel computation so that values, which are to be input to the memory blocks 34, 35, and 36, are transmitted between the processes during the period from when the computations are completed by executing the commands corresponding to the computation section 1051 in the processors, to when the memory blocks 34, 35, and 36 are updated by executing the commands corresponding to the update section 1052.

In the communication section 1053, the process (the processor) that transmits the message, and the process (the processor) that receives the message are described in each signal line that functions as the separator between the subsystem models. Accordingly, as described above, if a special common name or "a test point" is set as the attribute of each of the signal lines 31a, 32a, and 33a that function as the separators between the subsystem models, the position of the code group corresponding to each signal line, which functions as the separator between the subsystem models, is located using the special common name or "the test point" as the search key, and the identifiers for identifying the processes, which transmit and receive the data in accordance with the signal line, are extracted from the located code group, and the extracted identifiers are set in the communication section 1053 that is the code group used to transmit the data between the processes that run in parallel. Thus, by extracting the identifiers for identifying the processes that transmit and receive the data, it is possible to speed up the editing of the simulation program 105 for parallel computation.

After the source code of the simulation program 105 for parallel computation is edited, the source code of the simulation program 105 for parallel computation is compiled to an executable form. The complied simulation program 105 for parallel computation is input to the cluster computer 20 through a communication network that connects the host computer 10 to the cluster computer 20, or a removable memory such as a Flexible Disk (FD) or a Compact Disk (CD) (step S50 in FIG. 6).

Next, in the cluster computer 20, the parallel computation for obtaining the response of the model for parallel computation is performed, by executing the simulation program 105 for parallel computation (step S60 in FIG. 6).

Figure 13:
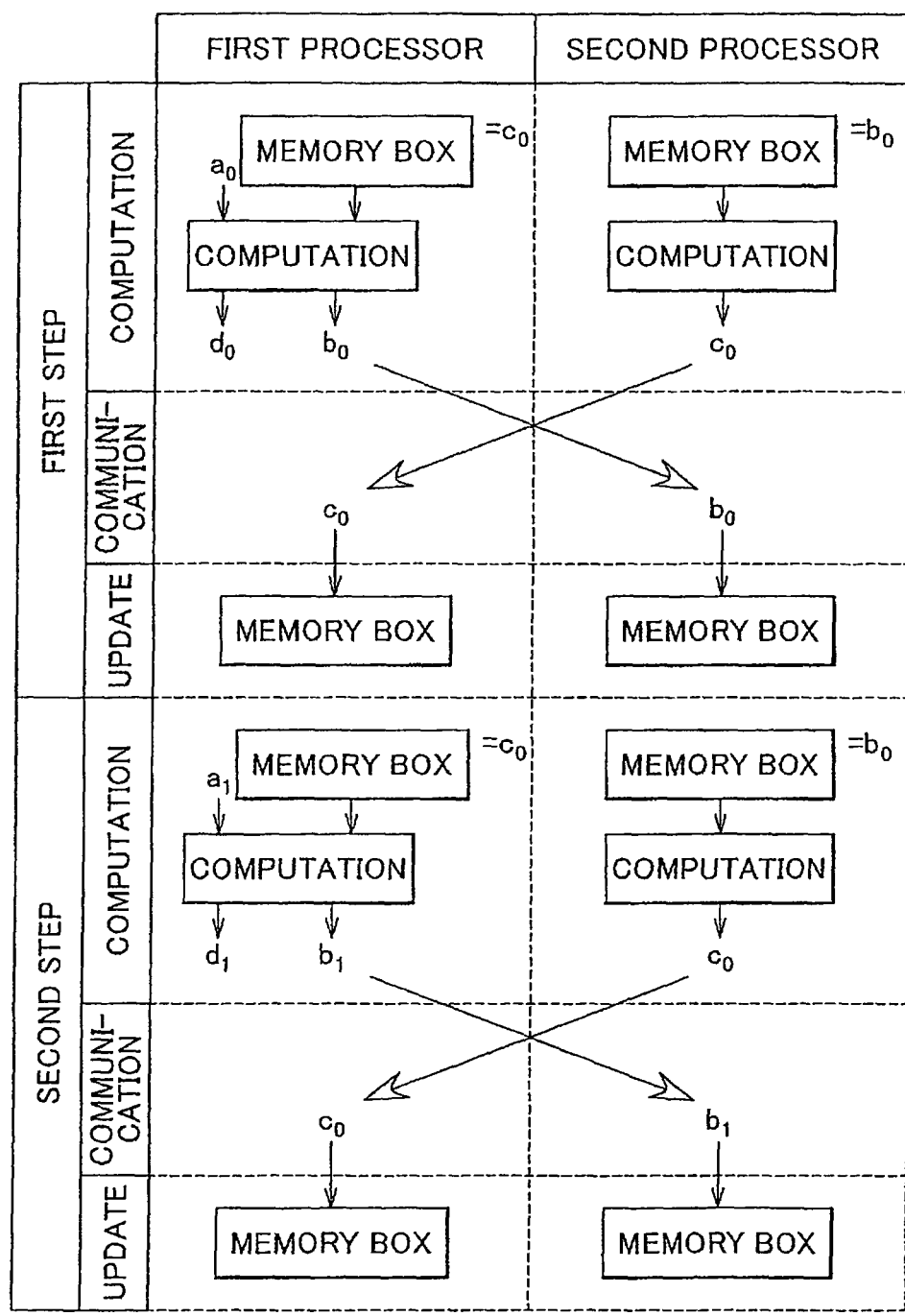
FIG. 13 is a sequence chart according to the embodiment of the invention.
Figure 14:
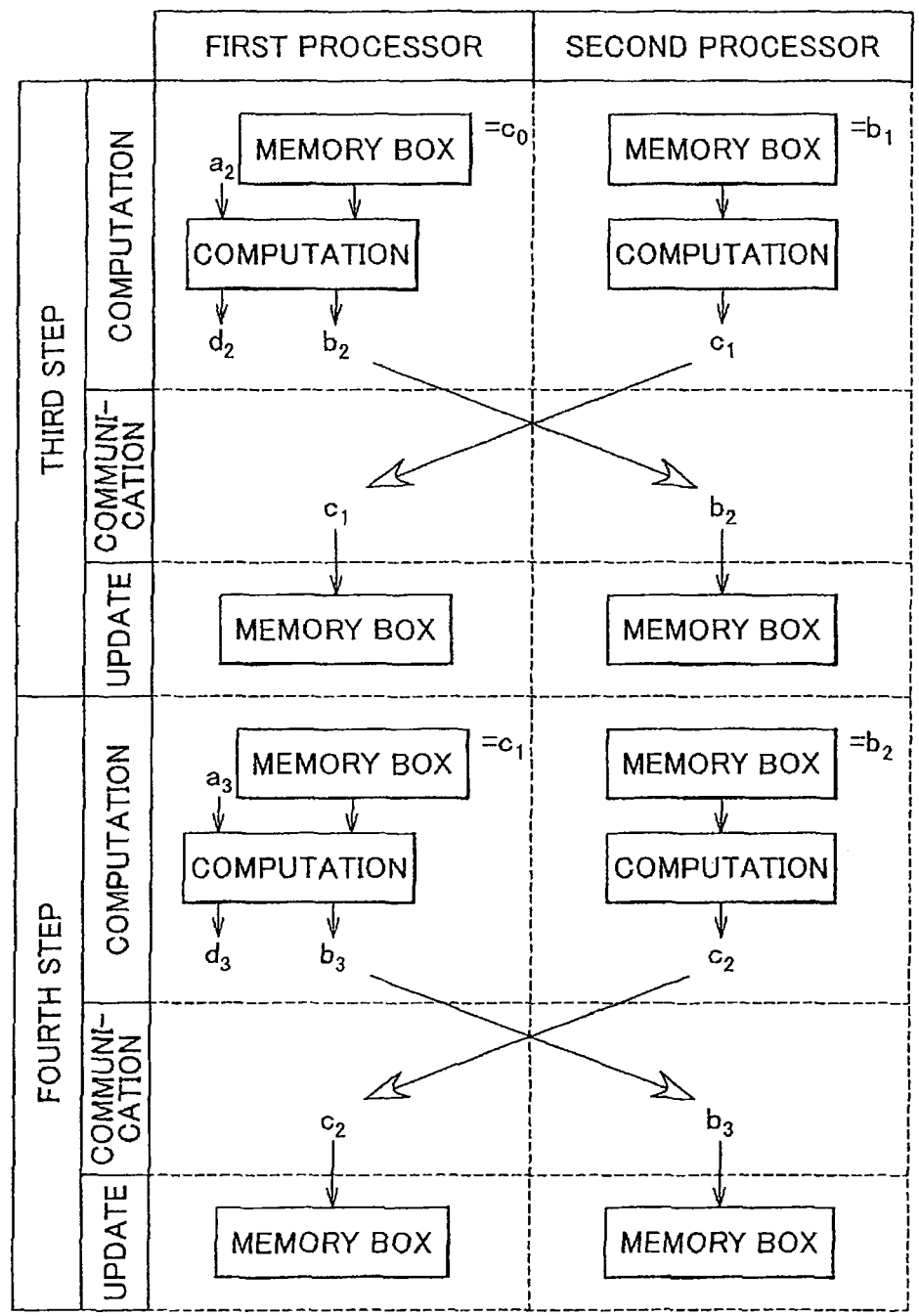
FIG. 14 is a sequence chart according to the embodiment of the invention.

Each of FIG. 13 and FIG. 14 is a sequence chart showing the flow of the parallel computation performed by executing the simulation program 105 for parallel computation in the cluster computer 20. Hereinafter, the sequence chart win be specifically described on the assumption that the process corresponding to the process in the block 30A is run by the second processor 23, and the process corresponding to the process other than the process in the block 30A is run by the first processor 21. That is, a variable "a" represents the input of the subject model 3, and for example, "$a_0$", "$a_1$", or "$a_2$" is assigned to the variable "a". A variable "b" represents the two inputs of the block 30A, and for example, "$b_0$", "$b_1$", or "$b_2$" is assigned to the variable "b". A variable "c" represents the output of the block 30A, and for example, "$c_0$", "$c_1$", or "$c_2$" is assigned to the variable "c". A variable "d" represents the response of the parallel computation model 3A, and for example, "$d_0$", "$d_1$", or "$d_2$" is assigned to the variable "d".

In each step, the first processor 21 executes all the commands assigned to the first processor 21, and the second processor 23 executes all the commands assigned to the second processor 23.

Figure 15:
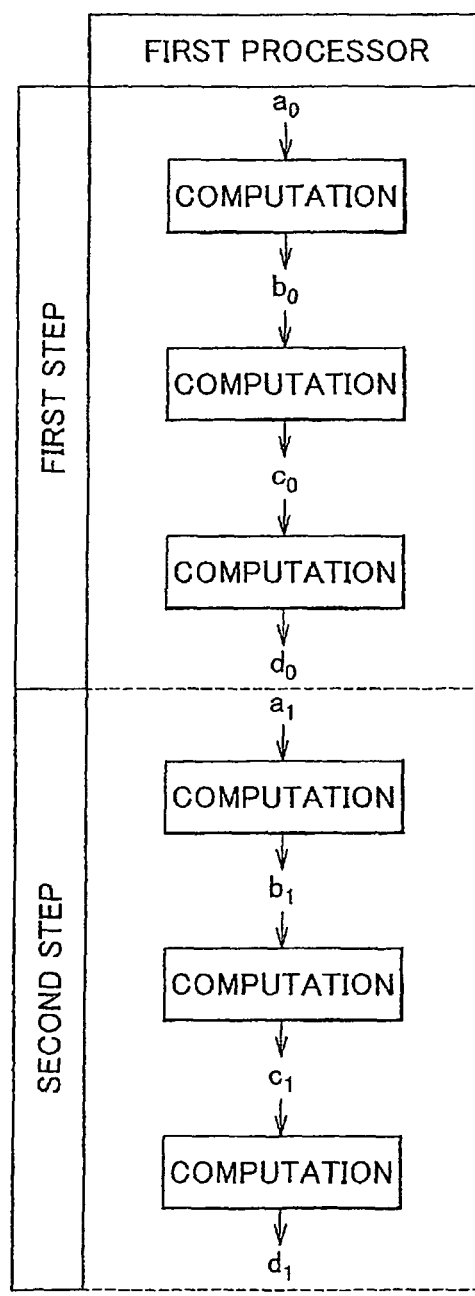
FIG. 15 is a sequence chart according to the embodiment of the invention.

In each step, the value of the variable "b" is output from the process run by the first processor 21 by performing the computation using the value of the variable "a" that is the input of the parallel computation model 3A, and the value of the variable "d" that is the output of the parallel computation model 3A is output from the process run by the first processor 21 by performing the computation using the value of the variable "c" that is the output of the process run by the second processor 23. When sequentially computing the response of the parallel computation model, the values of the variables obtained in the $n^{th}$ step are defined as "$a_n$", "$b_n$", "$c_n$", and "$d_n$", as shown in FIG. 15. In this case, "$b_{n-1}$" needs to be output from the process run by the first processor 21 in the $n^{th}$ step (n is an integer equal to or larger than 3) by performing the computation using "$a_{n-1}$", and "$d_{n-1}$" needs to be output from the process run by the first processor 21 in the $n^{th}$ step by performing the computation using $c_{n-3}$ so that the result of the parallel computation performed in the cluster computer 20 is equal to the response of the parallel computation model obtained by the sequential computation. On the other hand, "$c_{n-2}$" needs to be output from the process run by the second processor 23 in the $n^{th}$ step by performing the computation using "$b_{n-2}$". That is, when the values of the variables "b" and "c", which are transmitted between the processes that run in parallel, change with delay in this runner, it is ensured that the data in the processes are synchronized. As a result, the result of simulation performed using the parallel computation is completely equal to the result of simulation performed by the single processor.

According to the embodiment, the memory blocks 34, 35, and 36 are inserted in the subject model, and the values are maintained in the memory blocks 34, 35, and 36 until the commands corresponding to the update section 1052 are executed. Therefore, the variables "b" and "c", which are transmitted between the processes running in parallel, change with delay as described above. Also, the communication is performed between the process run by the first processor 21 and the process run by the second processor 23 during the period from when all the commands corresponding to the computation section 1051 are executed, to when the memory blocks 34, 35, and 36 are updated, in each step. More specifically, the memory boxes are updated by executing the commands corresponding to the update section 1052, after the commands corresponding to the communication section 1053 are executed. That is, because the update section 1052 is incorporated into the simulation program 105 for parallel computation, after all the commands corresponding to the computation section 1051 are executed by the first processor 21 and the second processor 23, all the commands corresponding to the communication section 1053 are executed by the first processor 21 and the second processor 23, and then, all the commands corresponding to the update section 1052 are executed by the first processor 21 and the second processor 23. Thus, according to the embodiment, the result of simulation performed using the parallel computation in the cluster computer 20 is completely equal to the result of simulation performed using the sequential computation in the host computer 10.

6. OTHER EMBODIMENTS

The technical scope of the invention is not limited to the above-described embodiment. Various modifications may be made without departing from the spirit of the invention. For example, the number of the processors in the cluster computer 20 may be three or more. The cluster computer 20 may include a plurality of computers that are completely independent of each other, and that are connected to each other by a communication line outside of the system. Also, the cluster computer 20 may be a common-memory cluster computer. When the cluster computer 20 is a common-memory cluster computer, only a process of synchronizing all the processors needs to be implemented in the communication section 1053. Also, the cluster computer 20 may be connected to, for example, a display, a mouse, and a keyboard, to operate the cluster computer 20. Also, the invention may be applied to a modeling tool other than the Simulink. It is possible to use, as the dummy blocks, blocks other than the memory blocks, which are used to synchronize the data in the processes, which are transmitted between the processes that run in parallel; blocks other than the memory blocks, which are used to make the output of the model for parallel computation, which is obtained by parallel computation, equal to the output of the model for parallel computation, which is obtained by sequential computation; blocks other than the memory blocks, which output values equal to values input to the blocks; and blocks other than the memory blocks, which are used to make the output of the model for parallel computation, which is obtained by parallel computation, equal to the output of the subject model, which is obtained by sequential computation, if the input of the model for parallel computation is equal to the input of the subject model.

By employing the memory blocks that are used to make the output of the model for parallel computation, which is obtained by parallel computation, equal to the output of the subject model, which is obtained by sequential computation, if the input of the model for parallel computation is equal to the input of the subject model, for example, the result of the parallel computation performed in the cluster computer 20 is made equal to the result of the sequential computation performed using the subject model in which the memory blocks are not inserted, that is, the original subject model shown in FIG. 7 and FIG. 8, in the embodiment. Thus, it is possible to decrease a time required to perform computation.

What is claimed is:

1. A simulation support method comprising:
converting a subject block diagram model using a generated operation interface, wherein the subject block diagram model represents a subject system to be simulated, to a model for parallel computation, in which a plurality of subsystem models are connected to each other, wherein the plurality of subsystem models correspond to a plurality of processes in one step, and the processes repeatedly run in parallel in a cluster computer;
synchronizing data in a parallel execution environment by inserting dummy blocks in the subject model using the generated operation interface;
editing a simulation program for parallel computation, based on the model for parallel computation that is the subject model in which at least the dummy blocks are inserted, wherein the simulation program for parallel computation is used to generate the processes that run in parallel in the cluster computer; and
incorporating a communication section into the simulation program for the parallel computation.

2. The simulation support method according to claim 1, further comprising:
making an output of the model for parallel computation using dummy blocks which is obtained by parallel computation, equal to an output of the model for parallel computation, which is obtained by sequential computation.

3. The simulation support method according to claim 1, further comprising:
making an output of the model for parallel computation using the dummy blocks which is obtained by parallel computation, equal to an output of the subject model, which is obtained by sequential computation, if an input of the model for parallel computation is equal to an input of the subject model.

4. The simulation support method according to claim 1, wherein
each of the dummy blocks outputs a value equal to a value input to the dummy block.

5. The simulation support method according to claim 1, wherein:
the dummy blocks are memory blocks, and values input to the memory blocks are stored in the memory blocks; and
the value stored in each of the memory blocks is maintained until the memory block is updated in the process corresponding to the subsystem model to which the memory block belongs.

6. The simulation support method according to claim 1, wherein
an operation for specifying, in each of the subsystem models, a processor corresponding to the subsystem model is received in the operation interface.

7. The simulation support method according to claim 1, wherein:
initial values of inputs of the subsystem models are obtained by computing a response of the subject model; and
initial values of the dummy blocks, which are initial values of inputs of the respective processes, are set to the initial values of the inputs of the respective subsystem models.

8. The simulation support method according to claim 1, wherein
a first code group is incorporated into the simulation program for parallel computation, and the first code group is used to transmit the data between the processes that run in parallel during a period from when all computations in the processes that run in parallel end, to when the data in the processes are updated, in each step.

9. The simulation support method according to claim 8, wherein
when the instruction for converting the subject model to the model for parallel computation is provided through the operation interface, an attribute, which is converted to a code that functions as a search key, is set in a signal line that functions as a separator between the subsystem models, a position of a second code group corresponding to the signal line is located, using the code as the key, identifiers for identifying the processes, which transmit and receive the data in accordance with the signal line, are extracted from the second code group, and the extracted identifiers are set in the first code group used to transmit the data between the processes that run in parallel.

10. A non-transitory computer-readable storage medium storing a simulation support program that makes a computer function as:
an operation interface used to convert a subject model that is a block diagram model representing a subject system to be simulated, to a model for parallel computation, in which a plurality of subsystem models are connected to each other, wherein the plurality of subsystem models correspond to a plurality of processes in one step, and the processes repeatedly run in parallel in a cluster computer;
a modeling support portion that inserts dummy blocks in the subject model using the operation interface, wherein the dummy blocks synchronize the data in a parallel execution environment;
a program edit portion that edits a simulation program for parallel computation, based on the model for parallel computation that is the subject model in which at least the dummy blocks are inserted, wherein the simulation program for parallel computation is used to generate the processes that run in parallel in the cluster computer; and
a communication section that is incorporated into the simulation program for the parallel computation.

11. The non-transitory computer-readable storage medium storing the simulation support program according to claim 10, wherein
the dummy blocks are used to make an output of the model for parallel computation, which is obtained by parallel computation, equal to an output of the model for parallel computation, which is obtained by sequential computation.

12. The non-transitory computer-readable storage medium storing the simulation support program according to claim 10, wherein
the dummy blocks are used to make an output of the model for parallel computation, which is obtained by parallel computation, equal to an output of the subject model, which is obtained by sequential computation, if an input of the model for parallel computation is equal to an input of the subject model.

13. The non-transitory computer-readable storage medium storing the simulation support program according to claim 10, wherein
each of the dummy blocks outputs a value equal to a value input to the dummy block.

14. The non-transitory computer-readable storage medium storing the simulation support program according to claim 10, wherein:
the dummy blocks are memory blocks, and values input to the memory blocks are stored in the memory blocks; and
the value stored in each of the memory blocks is maintained until the memory block is updated in the process corresponding to the subsystem model to which the memory block belongs.

15. A simulation support apparatus comprising:
a processor; and
a memory with computer readable instructions stored therein that provide:
an operation interface used to convert a subject model that is a block diagram model representing a subject system to be simulated, to a model for parallel computation, in which a plurality of subsystem models are connected to each other, wherein the plurality of subsystem models correspond to a plurality of processes in one step, and the processes repeatedly run in parallel in a cluster computer;
a modeling support portion that inserts dummy blocks in the subject model using the operation interface, wherein the dummy blocks synchronize the data in a parallel execution environment;
a program edit portion that edits a simulation program stored in a non-transitory computer-readable storage medium for parallel computation, based on the model for parallel computation that is the subject model in which at least the dummy blocks are inserted, wherein the simulation program for parallel computation is used to generate the processes that run in parallel in the cluster computer; and
a communication section that is incorporated into the simulation program for parallel computation.

16. The simulation support apparatus according to claim 15, wherein
the dummy blocks are used to make an output of the model for parallel computation, which is obtained by parallel computation, equal to an output of the model for parallel computation, which is obtained by sequential computation.

17. The simulation support apparatus according to claim 15, wherein
the dummy blocks are used to make an output of the model for parallel computation, which is obtained by parallel computation, equal to an output of the subject model, which is obtained by sequential computation, if an input of the model for parallel computation is equal to an input of the subject model.

18. The simulation support apparatus according to claim 15, wherein
each of the dummy blocks outputs a value equal to a value input to the dummy block.

19. The simulation support apparatus according to claim 15, wherein:
the dummy blocks are memory blocks, and values input to the memory blocks are stored in the memory blocks; and
the value stored in each of the memory blocks is maintained until the memory block is updated in the process corresponding to the subsystem model to which the memory block belongs.

20. A simulation apparatus comprising:
the simulation support apparatus according to claim 15; and
a simulation portion that computes a response of the subject model.

21. A simulation method comprising:
computing a response of a subject model that is a block diagram model representing a subject system to be simulated, in a host computer;
generating, in the host computer, an operation interface used to convert the subject model to a model for parallel computation, in which a plurality of subsystem models are connected to each other, wherein the plurality of subsystem models correspond to a plurality of processes in one step, and the processes repeatedly run in parallel in a cluster computer;
inserting dummy blocks in the subject model using the generated operation interface in the host computer, wherein the dummy blocks are used to synchronize the data in a parallel execution environment;
editing a simulation program for parallel computation, based on the model for parallel computation that is the subject model in which at least the dummy blocks are inserted, wherein the simulation program for parallel computation is used to generate the processes that run in parallel in the cluster computer;
computing a response of the model for parallel computation, by executing the simulation program for parallel computation in the cluster computer; and
incorporating a communication section into the simulation program for the parallel computation.

22. The simulation method according to claim 21, further comprising:
making the dummy blocks an output of the model for parallel computation, which is obtained by parallel computation, equal to an output of the model for parallel computation, which is obtained by sequential computation.

23. The simulation method according to claim 21, further comprises:
making the dummy blocks an output of the model for parallel computation, which is obtained by parallel computation, equal to an output of the subject model, which is obtained by sequential computation, if an input of the model for parallel computation is equal to an input of the subject model.

24. The simulation method according to claim 21, wherein each of the dummy blocks outputs a value equal to a value input to the dummy block.

25. The simulation method according to claim 21, wherein:
the dummy blocks are memory blocks, and values input to the memory blocks are stored in the memory blocks; and
the value stored in each of the memory blocks is maintained until the memory block is updated in the process corresponding to the subsystem model to which the memory block belongs.

* * * * *